US011149693B2

United States Patent
Oversby (10) Patent No.: US 11,149,693 B2
(45) Date of Patent: Oct. 19, 2021

(54) METHOD FOR DELIVERING A FLUID STORED IN LIQUEFIED FORM TO AN END USER IN GASEOUS FORM

(71) Applicant: WESTPORT POWER INC., Vancouver (CA)

(72) Inventor: Kevin K. Oversby, New Westminster (CA)

(73) Assignee: WESTPORT FUEL SYSTEMS CANADA INC., Vancouver (CA)

( * ) Notice: Subject to any disclaimer, the term of this patent is extended or adjusted under 35 U.S.C. 154(b) by 0 days.

(21) Appl. No.: 16/437,804

(22) Filed: Jun. 11, 2019

(65) Prior Publication Data
US 2019/0293029 A1    Sep. 26, 2019

Related U.S. Application Data

(62) Division of application No. 15/032,587, filed as application No. PCT/CA2014/051031 on Oct. 23, 2014, now Pat. No. 10,344,714.

(30) Foreign Application Priority Data

Oct. 31, 2013    (CA) ..................................... 2831762

(51) Int. Cl.
F02M 21/06        (2006.01)
F17C 9/02         (2006.01)
(Continued)

(52) U.S. Cl.
CPC ........ F02M 21/06 (2013.01); F02M 21/0221 (2013.01); F02M 21/0227 (2013.01);
(Continued)

(58) Field of Classification Search
CPC ...... F02M 21/0227; F02M 21/06; F17C 9/02; F17C 17/04
See application file for complete search history.

(56) References Cited

U.S. PATENT DOCUMENTS 5,409,046 A ‡ 4/1995 Swenson ................... F17C 9/02
                                              141/11
6,122,931 A ‡ 9/2000 Paganessi ................ C01B 7/01
                                              62/620
(Continued)

FOREIGN PATENT DOCUMENTS

CN    102121565 A  ‡  7/2011
CN    102121565 A     7/2011
(Continued)

OTHER PUBLICATIONS

Original and Translation of CN 104290654 A; Du Yingying, Li Jin, Zhou Shiguo, Qin Zirui, Li Yupeng; Jan. 21, 2015.*
(Continued)

*Primary Examiner* — Paul J Gray
(74) *Attorney, Agent, or Firm* — Seed IP Law Group LLP (57) ABSTRACT

A system and method is disclosed for storing a fluid in a storage vessel in liquefied form and delivering it in gaseous form to an end user through a supply line. The system comprises a pressure relief circuit for returning the fluid from the supply line to the vessel when predetermined conditions are met. The pressure relief circuit comprises a return line connected to the supply line and the storage vessel, a diversion line to divert the fluid elsewhere and a switching device operable to direct the fluid to either one of the lines, as a function of predetermined conditions.

22 Claims, 2 Drawing Sheets

(51) Int. Cl.
*F17C 7/02* (2006.01)
*F17C 7/04* (2006.01)
*F02M 21/02* (2006.01)

(52) U.S. Cl.
CPC .............. *F17C 7/02* (2013.01); *F17C 7/04* (2013.01); *F17C 9/02* (2013.01); *F17C 2205/0326* (2013.01); *F17C 2205/0332* (2013.01); *F17C 2205/0335* (2013.01); *F17C 2205/0347* (2013.01); *F17C 2221/012* (2013.01); *F17C 2221/03* (2013.01); *F17C 2221/033* (2013.01); *F17C 2223/0115* (2013.01); *F17C 2223/0161* (2013.01); *F17C 2223/033* (2013.01); *F17C 2223/035* (2013.01); *F17C 2223/043* (2013.01); *F17C 2223/046* (2013.01); *F17C 2225/0123* (2013.01); *F17C 2225/035* (2013.01); *F17C 2225/04* (2013.01); *F17C 2227/0107* (2013.01); *F17C 2227/0393* (2013.01); *F17C 2250/03* (2013.01); *F17C 2250/032* (2013.01); *F17C 2260/035* (2013.01); *F17C 2265/066* (2013.01); *F17C 2270/0168* (2013.01); *Y02E 60/32* (2013.01)

(56) References Cited

U.S. PATENT DOCUMENTS

| | | | |
|---|---|---|---|
| 8,028,724 B2 ‡ | 10/2011 | Lee et al. | |
| 9,759,382 B2 | 9/2017 | Adler et al. | |
| 2009/0095153 A1 ‡ | 4/2009 | Roper et al. | |
| 2009/0133674 A1 ‡ | 5/2009 | Lee ................ | B63B 25/14 123/527 |
| 2013/0160747 A1 ‡ | 6/2013 | Gibson ............ | F02M 21/06 123/557 |
| 2013/0220429 A1 | 8/2013 | Batenburg et al. | |
| 2013/0232997 A1 ‡ | 9/2013 | Gustafson ........ | F17C 7/04 62/48 |
| 2015/0226158 A1* | 8/2015 | Kurosawa ........ | F02M 21/0227 55/487 |

FOREIGN PATENT DOCUMENTS

| | | |
|---|---|---|
| DE | 10 2013 003 999 A1 | 9/2014 |
| EP | 2 964 998 A1 | 1/2016 |
| KR | 10-2007-0027922 A ‡ | 3/2007 |
| KR | 10-2007-0027922 A | 3/2007 |
| WO | 00/37847 A1 | 6/2000 |
| WO | WO 00/37847 A1 ‡ | 6/2000 |
| WO | 2013/118756 A1 | 8/2013 |
| WO | WO 2013/118756 A1 ‡ | 8/2013 |
| WO | 2014/135258 A1 | 9/2014 |

OTHER PUBLICATIONS

Canadian Office Action, dated Jan. 14, 2014, for Canadian Application No. 2,831,762, 2 pages.
Chinese Office Action, dated Jun. 19, 2017, for Chinese Application No. 201480057952.5, 15 pages (with English translation).
Chinese Search Report, dated Jun. 6, 2017, for Chinese Application No. 201480057952.5, 4 pages (with English translation).
Chinese Second Office Action, dated Feb. 7, 2018, for Chinese Application No. 201480057952.5, 6 pages. (with English Machine Translation).
Chinese Second Supplementary Search Report, dated Jan. 25, 2018, for Chinese Application No. 201480057952.5, 4 pages. (with English Machine Translation).
Extended European Search Report, dated May 23, 2017, for European Application No. 14857832.1-1760 / 3063456, 9 pages.
International Search Report and Written Opinion, dated Jan. 23, 2015, for PCT/CA2014/051031, 7 pages.
European Office Action dated Oct. 31, 2019 for European Application No. 14 857 832.1, 6 pages.
Examination Report for IN Application No. 201617014079 dated Aug. 23, 2019, 7 pages.

\* cited by examiner
‡ imported from a related application

METHOD FOR DELIVERING A FLUID STORED IN LIQUEFIED FORM TO AN END USER IN GASEOUS FORM

FIELD OF THE INVENTION

The present disclosure relates to a system and a method for delivering a fluid stored in liquefied form to an end user in a gaseous form. More particularly, the disclosed system and method are for handling a fluid that is normally in gaseous form at standard pressure and temperature conditions and that is stored in liquefied form in a storage vessel and for returning fluid in gaseous form to the storage vessel when predetermined conditions are met, thereby reducing the amount of fluid that is vented from the system.

BACKGROUND OF THE INVENTION

Systems for storing a fluid in liquefied form and delivering the fluid in gaseous form are gaining favor for delivering a fuel to internal combustion engines. Internal combustion engines have been used to produce power and drive machines for over a century. Historically, gasoline and diesel have been preferred fuel choices because they were abundant, inexpensive, and easy to store. While natural gas has been used as a fuel for vehicles for over fifty years, widespread use has been curtailed for various reasons including fuel storage density, infrastructure, availability of fuel, and capital costs that are generally higher compared to conventional liquid-fueled vehicles. However, alternative fuel choices are receiving renewed attention because of several factors, including changing economic conditions, the desire to reduce pollution, and the desire to reduce dependency on diminishing and increasingly expensive oil resources.

There are numerous advantages to substituting liquid fuels with natural gas or other gaseous fuels that are combustible in an internal combustion engine and which are in the gaseous phase at standard pressure and temperature conditions. "Standard pressure and temperature" are defined herein to be an absolute pressure of 1 bar (14.5 psi) and 0 degrees Celsius (32 degrees Fahrenheit). Natural gas is a mixture of combustible gases and its exact composition varies depending on the source, but it is ordinarily primarily methane. Other gaseous fuels include ethane, propane, and other lighter flammable hydrocarbon derivatives as well as hydrogen and mixtures thereof. For example, mixtures of hydrogen and natural gas have been used as a fuel for internal combustion engines, and such mixtures are sometimes referred to as "HCNG". Compared to conventional liquid fuels, the disclosed gaseous fuels are generally cleaner burning and can be produced from renewable sources. Natural gas is one of the most abundant gaseous fuels available today.

Because the available space for storing a fuel on board a motor vehicle is often limited, a factor that inhibits broader adoption of natural gas as a transportation fuel has been the energy density of gaseous fuels compared to liquid fuels. For example, natural gas stored in gaseous form, at a storage pressure of about 200 bar (3000 psi) requires a volume that is about 4 times the volume required to store the same amount of energy as diesel or gasoline. A solution for increasing the energy density of a gaseous fuel is to store it in liquefied form. For example, if the liquefied natural gas ("LNG") is stored at low temperatures, for example between about −150° C. and −130° C. (between about −240° F. and −200° F.), this can be achieved with a relatively low storage pressure (for example, pressures between about 1 and 13.8 bar (between about 14.5 and 100 psi)) for LNG. However, for systems that store a fluid such as natural gas in liquefied form and that deliver it in a gaseous form, a solution is required for reducing the venting of pressurized gaseous fluid from the system, under certain conditions, such as when the system is shut down or when the pressure in the fuel supply line is higher than a desired pressure commanded for operating the engine as being determined for example by reference to the engine map. In gas delivery systems that supply gases such as oxygen or nitrogen, while wasteful if high pressure gas needs to be relieved from the system, the pressurized gas can be simply vented to atmosphere without concern for its effect on the environment. In gas delivery systems that supply fuel to an engine, while natural gas is a naturally occurring constituent of the earth's atmosphere it normally exists in very small amounts and it is both undesirable and wasteful to vent natural gas to atmosphere. Accordingly, for fuel delivery systems that supply a gaseous fuel such as natural gas to an engine or other end user, even though the amount of gas present in a supply line is small, it is preferred to reduce the amount of natural gas that is vented from the supply line to the atmosphere.

Liquefied gaseous fuels, such as LNG, are stored in thermally insulated storage vessels to reduce heat leak into the storage space. Heat that leaks into the storage space can cause vaporization of some of the stored fluid, thereby increasing the vapor pressure. If the vapor pressure exceeds the predetermined relief pressure for the storage vessel, a pressure relief valve opens to prevent damage to the storage vessel. Typically the vapor vented from the storage vessel is released into the atmosphere. To minimize fuel venting to the atmosphere, LNG storage vessels include features for preventing heat from being introduced into the storage space and/or features to prevent increasing the vapor pressure in the storage vessel above the relief pressure.

Previous approaches for vehicular fuel systems have taught away from returning a fluid in gaseous form back to a storage vessel where the fluid is stored in liquefied form to thereby avoid increasing the pressure in the storage vessel above the relief pressure. For example, instead of recovering fluid in gaseous form, United States Patent Publication number 2009/0095153 teaches directing the vented gas from a storage vessel to a burner or a catalyst. Such solutions add more components and complexity to the system thereby reducing the overall system efficiency and increasing the system's capital and operational cost.

Other known systems that do recover a fluid in gaseous form such as the system described in United States Patent Publication number 2009/0133674 use a method which includes cooling and re-liquefying the fluid before it is returned to the storage vessel or before it is directed elsewhere. The equipment needed to re-liquefy the fluid is expensive, takes up space, and adds more complexity and weight to the system.

Accordingly, there is a need for a simple and more efficient system and method for reducing the amount of fluid in gaseous form that is vented to atmosphere, especially reducing the amount of fuel in gaseous form that is vented from an internal combustion engine.

SUMMARY OF THE INVENTION

The present invention relates to a system for storing a fluid in a storage vessel in liquefied form, and delivering it in gaseous form to an end user through a supply line, the system comprising a pressure relief circuit for returning the fluid from the supply line to the storage vessel when predetermined conditions are met. In preferred embodiments, the pressure relief circuit comprises a return line fluidly connected to the supply line and to the storage vessel and a switching device operable to divert the fluid to either one of the return line or elsewhere, as a function of predetermined conditions associated with a fluid parameter. A controller is programmed to control the switching device according to the predetermined conditions associated with the fluid parameter.

Some of the predetermined conditions for returning fluid to the storage vessel are required and some are included in preferred embodiments. For example, it is required that the pressure of the returning fluid be greater than the pressure inside the storage vessel because the fluid will not flow into the storage vessel when the returning fluid pressure is less than the pressure inside the storage vessel. For example, when a system is first shut down, the pressure in the supply line will normally be higher than the pressure in the storage vessel. As fluid is discharged from the supply line the pressure will decrease until eventually the fluid pressure is equal to the pressure in the storage vessel. Unless another predetermined condition has already dictated that the fluid be diverted elsewhere, when this happens, then the switching device is operated to divert the fluid elsewhere.

Another predetermined condition for returning fluid to the storage vessel can be whether or not the pressure inside the storage vessel is less than a preset storage vessel relief pressure by a predetermined margin. If the return of the fluid to the storage vessel would result in an increase in the vapor pressure inside the storage vessel that would trigger the opening of its pressure relief valve, then for some embodiments it is preferred to divert the fluid elsewhere instead of causing vapor to be vented from the storage vessel.

In some embodiments, the fluid can be vented to the atmosphere, but even in these situations the overall amount of fluid that is vented to atmosphere is reduced because some of the fluid is returned to the storage vessel when the predetermined conditions are met. In other embodiments, when the fluid is not returned to the storage vessel it can be diverted elsewhere, for example to a storage tank for holding the fluid in gaseous form, or to a flame or catalytic burner, or it can be re-liquefied before being returned to the storage vessel. With the disclosed system the amount of fluid that is diverted is less than the total amount that is discharged from the supply line so this means that the components associated with the diverted fluid can be smaller than they would need to be in a system that does not return any of the fluid to the storage vessel, which permits the disclosed system to be smaller and more efficient, with less of the fluid being wasted.

The method may further comprise preventing the return of the fluid to the storage vessel when contaminants in liquid or vapor form such as liquid fuel or lubricants are detected in the fluid. To enable this method the electronic control unit or another computer can be programmed to analyze data collected from sensors and diagnose when the fluid contains contaminants.

The disclosed switching device can be an electronically controlled three-way valve or a functionally equivalent arrangement with two-way control valves. In some embodiments, a check valve is disposed on the return line to prevent fluid flowing from the storage vessel into the return line. The three-way valve has an inlet that receives fluid from the supply line, a first outlet fluidly connected to the return line to the storage vessel and a second outlet fluidly connected to a diversion line through which fluid is diverted if the conditions that permit the fluid return to the storage vessel are not met. With the three-way valve, the fluid can be directed from the supply line to either the storage vessel through the return line or to the diversion line at any given time. The direction of fluid flow, and hence the position of the three-way valve is dependent on the predetermined conditions. For example, if the pressure of the returning fluid is not higher than the pressure in the storage vessel, the three-way valve can be biased to direct fluid flow through the diversion line to the atmosphere, to a burner, a catalytic converter or to another storage tank for holding the fluid in gaseous form.

In other embodiments, the three-way valve can be replaced by a line with two branches, with a first control valve on one branch and a second control valve on the other branch, wherein the first control valve is fluidly connected to the diversion line and the second control valve is fluidly connected to the return line.

In some embodiments, a filter is located in the return line to selectively filter impurities from the fluid before it is returned to the storage vessel. For example, when the system is part of a dual fuel engine fueled with natural gas and diesel, there is potential for trace amount of diesel vapor to leak in the return line, and with such system a vapor filter can be employed to prevent any diesel vapor being returned to the storage vessel.

The system can further comprise other features including a gas separator placed in the diversion line to separate gases from liquid and solid contaminants so that only gases are diverted. For example, when the system is part of a dual fuel engine, there is the potential for trace amounts of liquid fuel, lubricants or other contaminants to leak into the gaseous fuel system, and with such systems, a gas separator can be employed to separate the liquid from the gas and return the liquid to a liquid fuel tank through a liquid fuel return line.

If the disclosed system is employed as a fuel system for delivering a fuel in gaseous form to an internal combustion engine, the engine can be one that is dedicated to gaseous fuel, meaning that it is fueled only with gaseous fuel, or the engine can be a bi-fuel engine that is defined herein to be an engine that can be fueled with either a gaseous fuel alone or a liquid fuel alone, or the engine can be a dual fuel engine that is defined herein to be an engine that is fueled with a gaseous fuel and a liquid fuel at the same time, or it can be an engine that operates in different modes under different conditions.

For embodiments where the end user is an internal combustion engine fueled mainly with a gaseous fuel, the controller can be programmed to control the switching device to return fuel in gaseous form to the storage vessel if a predetermined time has elapsed since the engine has stopped running in a liquid-only fueled mode.

While this disclosure describes an engine fuel system as a particularly suitable application, the disclosed fluid delivery system can be applied to any other apparatus used to store a fluid in liquefied form and to deliver the fluid is a gaseous form. For example, the disclosed system can be part of a filling station that dispenses the fluid so that the end user is a storage vessel that is filled by the filling station. That is, the "end user" is whatever is attached to the supply line to receive the fluid in gaseous form, and can be something that is permanently connected to the supply line, like an engine, or something that is only connected to the supply line when the system is in operation, for example, a storage vessel that is temporarily attached to a filling station.

In this disclosure, the term "line" is defined to be any sort of pipeline, conduit, tubing, hose or any like component for conveying the fluid within the disclosure system and from the storage vessel to the end user. It is understood that these lines are made from materials suitable in size, strength and durability for the operating conditions, with allowance for the necessary safety factors.

Linked to the disclosed systems, a method is provided for storing a fluid in a storage vessel in liquefied form and delivering it in gaseous form through a supply line to an end user. The method comprises reducing fluid pressure in the supply line by returning the fluid to the storage vessel when predetermined conditions are met, and diverting the fluid elsewhere when the predetermined conditions are not met. In preferred embodiments of the method, at least some of the predetermined conditions are a function of parameters associated with the fluid in the supply line. Like with the disclosed system, in the disclosed method, some of the predetermined conditions are required and some are included in preferred embodiments of the method. For example, for returning the fluid to the storage vessel it is required that the pressure of the fluid in the supply line is greater than a predetermined low pressure threshold, more specifically that it is greater than the pressure inside the storage vessel. In preferred embodiments, the predetermined conditions require that the pressure in the storage vessel remains below a threshold safety pressure. Therefore in some embodiments, the predetermined conditions for returning the fluid to the storage vessel include that the pressure inside the storage vessel is less than a preset storage vessel relief pressure by a predetermined margin so that the return of fluid to the storage vessel does not trigger venting from the vessel.

In other embodiments, fluid is diverted elsewhere when the fluid pressure in the supply line is determined to be higher than a predetermined high pressure threshold Another predetermined condition to be met for returning the fluid to the storage vessel includes that the fluid and/or the supply line do not contain any contaminants such as a liquid fuel.

When the fluid is diverted elsewhere, the method can further comprise at least one of venting the fluid to atmosphere, holding the fluid in a pressure-rated vessel in gaseous form, directing the fluid to a burner, or directing the fluid to a device for re-liquefying the fluid before returning it to the storage vessel.

For systems where the end user is an internal combustion engine fueled with gaseous fuel at least one of the predetermined conditions for returning fuel to the storage vessel requires that a predetermined time has elapsed since the engine has stopped running in a liquid-only fueled mode.

Additional features and advantages of the invention may be understood from other sections of this disclosure by reference to the drawings, and by practicing the disclosed method with the disclosed system.

DETAILED DESCRIPTION OF PREFERRED EMBODIMENT(S)

Figure 1:
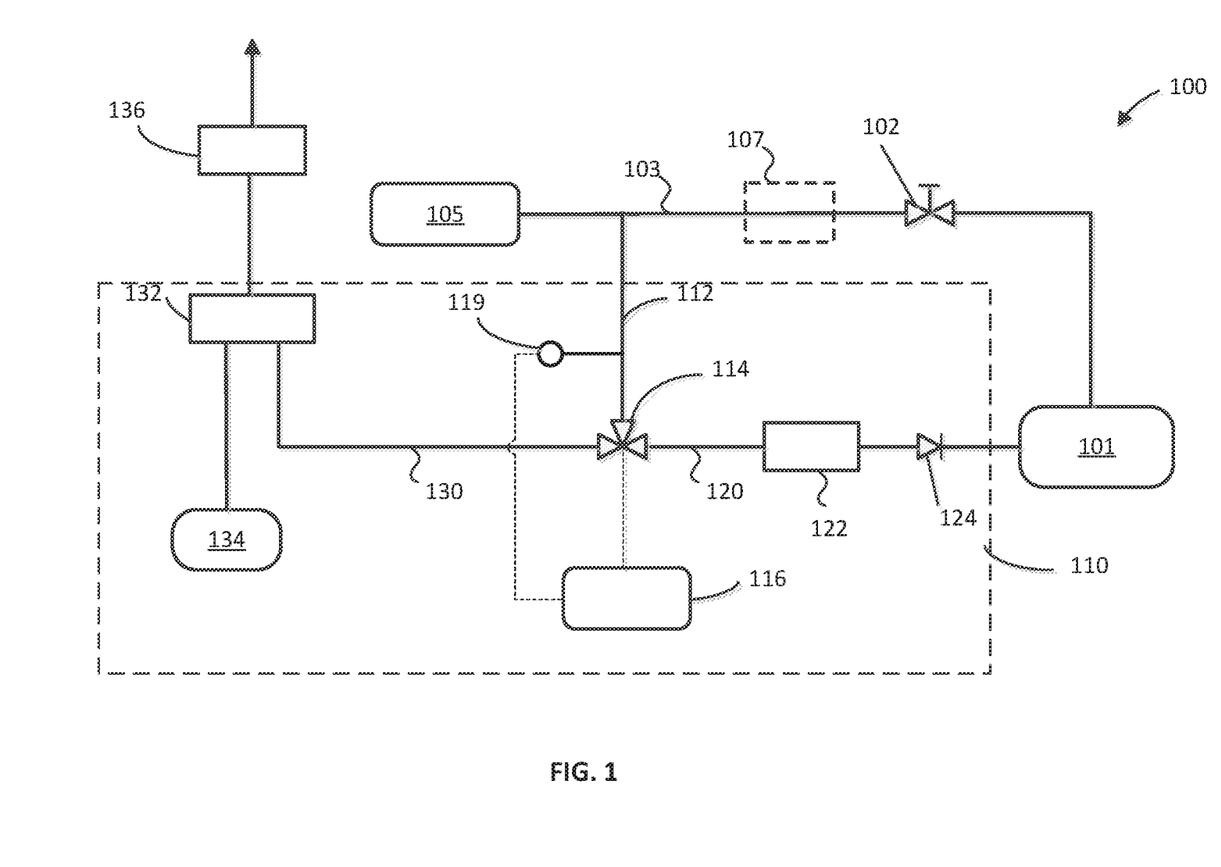
FIG. 1 is a schematic diagram of a preferred embodiment of a system for delivering a gas stored in a vessel in liquefied form to an end user.

With reference to the schematic diagram of FIG. 1, system 100 comprises storage vessel 101 for storing a fluid in liquefied form and supply line 103 for delivering fluid in gaseous form to an end user 105. The fluid may be taken from the vapor space of storage vessel 101, already in gaseous form, or it can be warmed and vaporized in optional vaporizer 107, shown in dashed lines, or it can be delivered to the supply line as a supercritical fluid. End user 105 can be an internal combustion engine fueled with a gaseous fuel as further described in a preferred embodiment or it can be for example a second storage vessel which is filled with gaseous fuel supplied from storage vessel 101. Pressure relief circuit 110 comprises relief line 112 which is fluidly connected to supply line 103 and to switching device 114, which, in the embodiment illustrated in FIG. 1, is a three-way valve. Pressure relief circuit 110 further comprises return line 120 and diversion line 130, which are each fluidly connected to switching device 114. Switching device 114 is controlled by commands sent from controller 116, which, in typical embodiments, is an electronic control unit. When the end user 105 is receiving fluid from storage vessel 101 or at times when fluid pressure is wanted or required in supply line 103 and when the pressure in supply line 103 is below a predetermined pressure limit determined for example as a function of the current operating conditions of the end user 105, controller 116 commands switching device 114 to a position that prevents any fluid from flowing through relief line 112 to either return line 120 or diversion line 130. When the end user is supplied with fluid through supply line 103, but the pressure in supply line 103 is higher than a desired pressure determined for example as a function of the current operating conditions for that end user 105 or, alternatively, when fluid is to be discharged from supply line 103, for example when the end user 105 is shut down or when fluid is otherwise no longer required by the end user, controller 116 commands switching device 114 to a position that allows fluid to flow through relief line 112 and switching device 114 to return line 120 or to diversion line 130. Controller 116 commands switching device 114 to a position that directs fluid through return line 120 and back to storage vessel 101, or diverted elsewhere through diversion line 130 as a function of whether controller 116 determines that predetermined conditions have been met for returning the fluid to storage vessel 101. Contrary to conventional systems which avoid returning any fluid in gaseous form from a supply line back to the storage vessel (where the fluid is stored in liquefied form), if the mass of fluid to be returned to the storage vessel is relatively small compared to the mass of fluid already stored in the storage vessel, and if the fluid can be returned to the storage vessel without causing fluid to be vented therefrom, the disclosed system and method can be beneficial in recovering some of the fluid that might otherwise be wasted.

Return line 120 can further comprise filter 122 for removing contaminants from the fluid before it is returned to storage vessel 101. Contaminants such as lubricants or other impurities can be introduced into the fluid as it flows through the supply line and through the components disposed therein, such as pumps, filters, pressure reducers and other components included in the delivery system through which the fluid flows. If such contaminants include ones that can freeze when subjected to the colder temperatures inside the storage vessel, such frozen contaminants in solid form can cause damage to the system components. For example, if end user 105 is a dual fuel engine fueled with a gaseous fuel and a liquid fuel, filter 122 can remove any liquid fuel in vapor form which has contaminated the gaseous fuel that is returned to storage vessel 101, by way of example, filter 122 can be a carbon-activated hydrocarbon vapor filter.

Return line 120 passes through check valve 124, which prevents fluid backflow from storage vessel 101 through return line 120.

FIG. 1 shows an embodiment of the system in which diversion line 130 vents the fluid to the atmosphere. This arrangement can work for example, when the system is a fuel delivery system for an engine that is fueled with natural gas and there is only a small amount of natural gas in supply line 103. For example, when the engine is shut down, it is preferred to discharge fuel from the fuel supply line and reduce the pressure of the gaseous fuel within the supply line so that it is not filled with natural gas with a pressure above atmospheric pressure when the engine is not running. In some conventional engines described in the prior art, since the volume of the fuel supply line is very small, all of the fuel is vented to atmosphere. In the present system illustrated in FIG. 1, to improve the efficiency of the system and to reduce waste, when predetermined conditions are met, at least some fluid is returned to storage vessel 101. As shown in the embodiments of FIG. 1, before even a reduced amount of gaseous fuel is vented to the atmosphere the gaseous fuel passes through gas separator 132 which separates gaseous fuel from any liquid fuel, lubricants or other contaminants that might have leaked into the stream of gaseous fuel, which is sometimes possible for example in the case of dual fuel or bi-fuel engines. In such systems, the liquid fuel collected by gas separator 132 can thereby be recovered and returned to liquid fuel tank 134. In some embodiments, for example in dual fuel engine systems fueled with natural gas and diesel, a carbon-activated hydrocarbon vapor filter can be used between gas separator 132 and liquid fuel tank 134.

In some embodiments, diversion line 130 can direct the vented fluid through a treatment device 136, which can be a catalytic converter or any other type of burner to convert the fluid into another form before being vented to atmosphere. In other embodiments (not shown), instead of being vented to atmosphere the fluid can be directed instead to a secondary user or to a re-liquefication device, such as a cryocooler, to re-liquefy the fluid so that it can be returned to storage vessel 101. Devices for re-liquefying a gas can be expensive and can consume energy so an advantage of returning some or most of the fluid to the storage vessel in gaseous form is that it enables the use of a re-liquefying device with a smaller flow-through capacity and reduced energy consumption.

In preferred embodiments of the disclosed system, when applied to a fuel delivery system for an engine, when controller 116 determines that the fluid should be discharged from supply line 103, tank shut off valve 102 is closed and controller 116 commands switching device 114 to open to either return the fluid to storage vessel 101 or direct it to diversion line 130. The fluid pressure in the supply line, depending upon the engine design and the operating conditions, generally is between 180 and 300 bar (at about 2610 to 4351 psi), which is much greater than the pressure in the storage vessel 101, which is typically between 0 and 16 bar (between 0 to about 232 psi). In preferred embodiments, the pressure of the fluid in the supply line is a fluid parameter that forms the basis for one of the predetermined conditions that must be met for controller 116 to command switching device 114 to a position that returns the fluid to storage vessel 101. The pressure in fluid supply line 103 is measured by a pressure sensor 119 that can be placed in supply line 103 or in relief line 112 (as illustrated). If the fluid pressure is too high, returning the fluid to the storage vessel could result in immediate venting from the storage. However, controller 116 can be programmed to determine or approximate whether returning the fluid to the storage vessel 101 will result in triggering the storage vessel's pressure relief system. For example, the pressure of the fluid in the supply line could be higher than the normal pressure in the storage vessel 101 and still be returned thereto if the amount fluid to be returned is sufficiently small relative to the amount of fluid stored in the storage vessel, and to the volume of the storage vessel and if the fluid returning to the storage vessel 101 can be received without raising the pressure in the storage vessel 101 above the predetermined pressure relief limit. Accordingly, depending on the pressure ratings for a particular system and other system parameters considered by controller 116, switching device 114 can be commanded to direct fluid to diversion line 130 or to storage vessel 101 when the predetermined conditions are met. That is, controller 116 controls whether fluid is returned to storage vessel 101 or diverted to diversion line 130 depending on the predetermined conditions associated with a particular system.

If the fluid can be received into storage vessel 101 without causing any immediate venting from storage vessel 101, then the fluid can be initially returned to storage vessel 101. If the controller determines that the pressure in the supply line is too high then the fluid might be initially directed to diversion line 130. As fluid is discharged from supply line 103, fluid pressure in supply line 103 starts to drop and when it reaches a lower range at which fluid can be received into the storage vessel, controller 116 can command switching device 114 to a position in which fluid is returned to storage vessel 101. When fluid pressure in supply line 103 drops below a predetermined threshold and it becomes substantially equal to or lower than the pressure in storage vessel 101 or when the pressure differential between the fluid pressure in supply line 103 and the fluid pressure in storage vessel 101 drops below a predetermined amount within an acceptable time frame, controller 116 can be programmed to command switching device 114 back to a position that directs the fluid to diversion line 130.

In other embodiments, the fluid is always returned to storage vessel when fluid pressure in the supply line is greater than the fluid pressure in the storage tank by a predetermined margin. That is, for systems where the volume of the supply line is so much smaller than the volume of the storage vessel that the amount of fluid being returned to the storage vessel is so small relative to the amount of fluid stored inside the storage vessel, it can be presumed that the increase in pressure caused by the high pressure fluid will not cause venting from the storage vessel even if the returning fluid has a much higher pressure, such as, for example, 300 bar. That is, if the system is designed to be able to absorb the returned fluid without causing more fluid to be vented from the storage vessel than the amount that is returned, the system can be simplified by being designed to control switching device 114 to allow fluid to be returned through return line 120 to storage vessel 101.

Other than the pressure of the fluid in supply line 103, the pressure of the fluid in storage vessel 101, and the design parameters associated with the storage vessel, such as the preset relief pressure, the size of the storage vessel and its ability to absorb a small amount of high pressure fluid in gaseous form, some embodiments can be designed to consider other parameters that can be measured and made part of the predetermined conditions that controller 116 considers in determining whether to return the fluid to storage vessel 101 or direct it to diversion line 130.

An example of the disclosed system and method is now disclosed with reference to certain parameter values associated with a preferred embodiment for a gaseous fuel system for an internal combustion engine where gaseous fuel is directly injected into the combustion chamber. In such a system, during engine operation, the pressure of the fluid in the supply line is maintained at about 180-300 bar (at about 2600 to 4350 psi). The pressure in the storage vessel is generally about 0-16 bar (between 0 to about 230 psi). The fluid should not be returned from the supply line to the storage vessel if it will result in raising the pressure in the storage vessel above the preset relief pressure, which is generally about 16 bar (about 230 psi), but could be higher depending on the system design. In some embodiments, the pressure inside the vapor space of storage vessel 101 is monitored and fluid is returned to the storage vessel only when the storage vessel pressure is below a predetermined fixed limit which equals to the safety relief pressure for that particular vessel minus a predetermined margin.

An additional predetermined condition includes returning the fluid to the storage vessel when diagnostics from the electronic control unit indicate that the drained fluid does not contain any contaminants. Contaminants are defined herein to mean any fluids that can take a solid form in a cryogenic environment. For example, with fuel systems for a dual fuel engine which is fueled for example with natural gas and diesel, it can be possible for the fluid to be contaminated with diesel or other heavy hydrocarbons and if this is the case then the fluid is not returned to the storage vessel unless the system includes a gas separator. In such embodiments the controller receives data from sensors and is programmed to determine if diesel or other heavy hydrocarbons are present in the fluid. For dual-fuel engine systems that run mainly on gaseous fuels but can also run in a liquid-fueled only mode, the system can be programmed with a predetermined time-delay after the engine has switched off to a gaseous-fuel mode before controller 116 can direct the fluid through return line 120, to ensure that liquid fuel is not passed into storage vessel 101. Alternatively, a liquid sensing device could be placed in relief line 112, in return line 120 or in filter 122 and controller 116 commands switching device 114 to divert the fluid elsewhere when the sensing device indicates that there is liquid present in fluid and to return of gaseous fuel to storage vessel 101 only when the sensing device indicates that the gaseous fuel in return line 120 is free of any liquid fuel.

Figure 2:
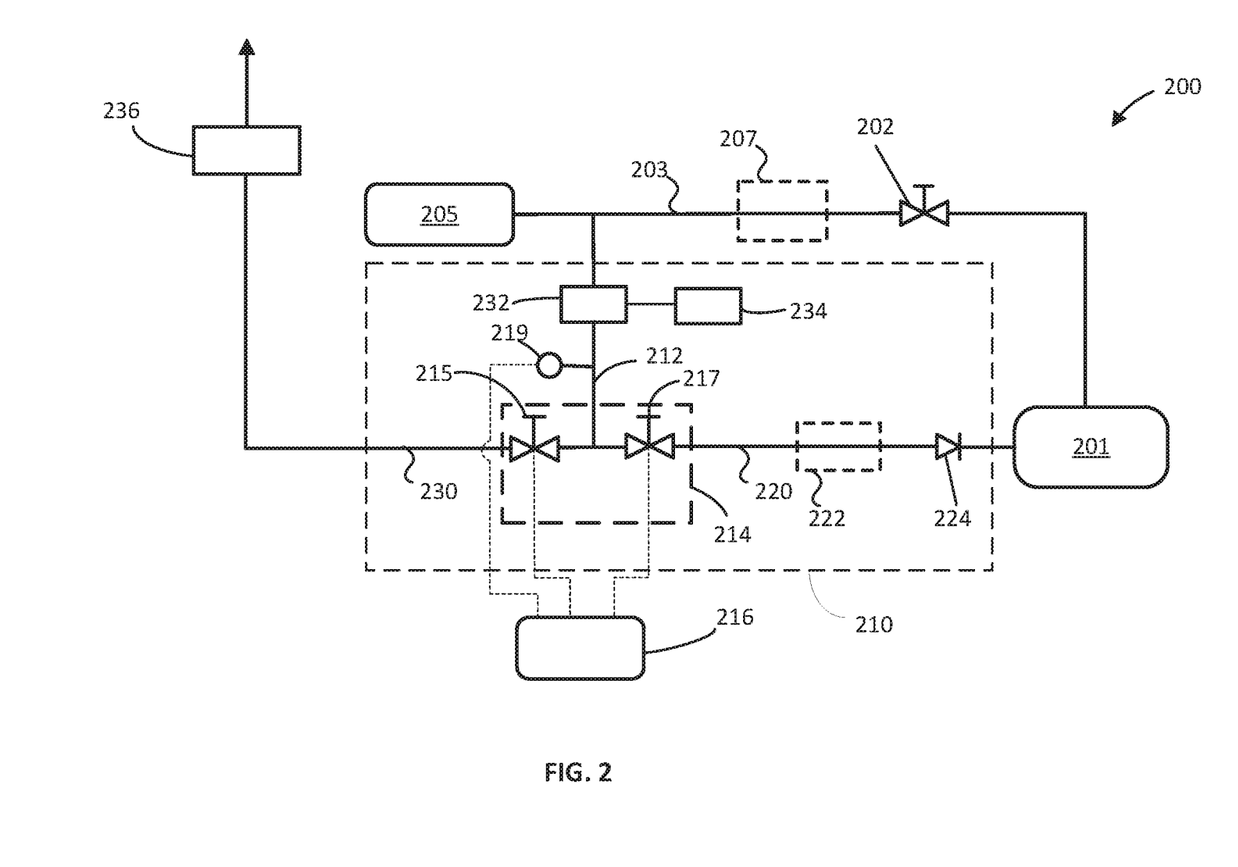
FIG. 2 is a schematic diagram of an alternate embodiment of a system for delivering a gas stored in a vessel in liquefied form to an end user.

With reference now to the schematic diagram of FIG. 2 an alternate embodiment of the disclosed system is shown. This alternative embodiment has many components that are the same or equivalent to components of the embodiment shown in FIG. 1. Such like components are identified by like reference numbers increased by an increment of 100, and their function and what they are, may not be repeated in the description of the embodiment shown in FIG. 2.

One difference between the two illustrated embodiments is that the embodiment illustrated in FIG. 2 has a gas separator 232 disposed on relief line 212 upstream from switching device 214. This allows liquid and other non-gaseous impurities to be separated from the gaseous fluid before the pressure relief circuit branches to return line 220 or diversion line 230, and in some systems this obviates the need for a filter 222 in return line 220, which is illustrated here as an optional component.

The embodiment in FIG. 2 also illustrates an alternative form for switching device 214. Instead of a three-way valve, switching device 214 comprises a line with two branches with control valve 215 on one branch and control valve 217 on the other branch. Controller 216 commands first control valve 215 to open when fluid is to be directed to diversion line 230 and/or it commands second control valve 217 to open when fluid is to be directed to return line 220. When second control valve 217 is open, fluid flows through check valve 224 to storage vessel 201. When fluid pressure in return line 220 is lower than the pressure needed to open check valve 224 and to overcome the pressure inside storage vessel 201 and the end user 205 is shut down and fluid has to be discharged from supply line 203, controller 216 opens first control valve 215 and fluid will flow only to diversion line 230. When fluid pressure in supply line 203 is higher than a predetermined level as determined by the operating condition of the end user 205 or when the end user 205 is shut down and fluid pressure in supply line 203 has to be reduced, it is possible to open either first control valve 215 or second control valve 217 to direct fluid to either diversion line 230 or return line 220. First control valve 215 and second control valve 217 can be either fully or partially open. In some embodiments, controller 216 can command both first control valve 215 and second control valve 217 to an open position so that fluid flows through both diversion line 230 and return line 220 at the same time.

In some embodiments, when the end user 205 is shut down and fluid has to be discharged from supply line 203, initially the pressure in relief line 212 is higher than the pressure in storage vessel 201 by a predetermined threshold and second control valve 217 is open so that fluid is returned to storage vessel 201. When the pressure in relief line 212 becomes equal to the pressure in storage vessel 201 controller 216 commands first control valve 215 to open and fluid is diverted elsewhere.

The operation of this embodiment illustrated in FIG. 2 is generally similar to the operation of the embodiment shown in FIG. 1.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A method, comprising:
   storing a fluid in a vessel in liquefied form;
   delivering said fluid in gaseous form through a supply line to an end user;
   upon meeting a predetermined condition, reducing a fluid pressure in said supply line by directing fluid through a switching device to return said fluid in gaseous form from said supply line to said vessel; and
   upon not meeting said predetermined condition, directing said fluid through said switching device to divert said fluid from returning to said vessel and from being delivered to said end user through said supply line by directing said fluid elsewhere through a diversion line.

2. The method of claim 1, further comprising determining said fluid pressure in said supply line, and wherein directing said fluid elsewhere through said diversion line includes diverting said fluid elsewhere when said fluid pressure is determined to be higher than a predetermined high pressure threshold.

3. The method of claim 1, further comprising determining said fluid pressure in said supply line, and wherein directing said fluid elsewhere through said diversion line includes diverting said fluid elsewhere when said fluid pressure is determined to be lower than a predetermined low pressure threshold.

4. The method of claim 1, wherein said predetermined condition correlates to keeping a pressure inside said vessel below a threshold safety pressure of said vessel.

5. The method of claim 2, wherein said predetermined condition correlates to keeping a pressure inside said vessel below a threshold safety pressure of said vessel.

6. The method of claim 3, wherein said predetermined condition correlates to keeping a pressure inside said vessel below a threshold safety pressure of said vessel.

7. The method of claim 1, wherein said predetermined condition correlates to a pressure inside said vessel being less than a preset vessel relief pressure by a predetermined margin.

8. The method of claim 2, wherein said predetermined condition correlates to a pressure inside said vessel being less than a preset vessel relief pressure by a predetermined margin.

9. The method of claim 3, wherein said predetermined condition correlates to a pressure inside said vessel being less than a preset vessel relief pressure by a predetermined margin.

10. The method of claim 1, further comprising diagnosing whether said fluid contains contaminants and diverting said fluid elsewhere when contaminants are detected.

11. The method of claim 1, further comprising determining said fluid pressure in said supply line, and wherein directing said fluid elsewhere through the diversion line includes diverting said fluid to a burner when at least one of the following is determined:
   said fluid pressure is determined to be higher than a predetermined high pressure threshold; and
   said fluid pressure is determined to be lower than a predetermined low pressure threshold.

12. The method of claim 1, further comprising determining said fluid pressure in said supply line, and wherein directing said fluid elsewhere through said diversion line includes diverting said fluid to a catalytic converter when at least one of the following is determined:
   said fluid pressure is determined to be higher than a predetermined high pressure threshold; and
   said fluid pressure is determined to be lower than a predetermined low pressure threshold.

13. The method of claim 1, further comprising determining said fluid pressure in said supply line, and wherein directing said fluid elsewhere through said diversion line includes diverting said fluid to a secondary user or another tank when at least one of the following is determined:
   said fluid pressure is determined to be higher than a predetermined high pressure threshold; and
   said fluid pressure is determined to be lower than a predetermined low pressure threshold.

14. The method of claim 1, further comprising determining said fluid pressure in said supply line, and wherein directing said fluid elsewhere through said diversion line includes diverting said fluid to a re-liquefication device when at least one of the following is determined:
   said fluid pressure is determined to be higher than a predetermined high pressure threshold; and
   said fluid pressure is determined to be lower than a predetermined low pressure threshold.

15. The method of claim 1, wherein said end user is an internal combustion engine and said method further comprises delaying to return said fluid to said vessel until a predetermined time has elapsed.

16. The method of claim 3, wherein said end user is an internal combustion engine and said method further comprises delaying to return said fluid to said vessel until a predetermined time has elapsed since said engine has stopped running.

17. A method, comprising:
   containing a fluid in a vessel in liquefied form;
   delivering the fluid in gaseous form through a supply line to an end user;
   positioning a switching device to a first opened position when a predetermined condition is met, the positioning of the switching device to the first opened position causing the fluid in gaseous form from the supply line to return to the vessel, the returning of the fluid in gaseous form thereby reducing fluid pressure in the supply line; and
   positioning the switching device to a second opened position when the predetermined condition is not met, the positioning of the switching device to the second opened position causing the fluid in gaseous form from the supply line to divert the fluid in gaseous form from returning to said vessel and from being delivered to said end user through said supply line by directing said fluid elsewhere through a diversion line.

18. The method of claim 17, further comprising at least one of the following:
   determining the fluid pressure in the line, and wherein directing said fluid elsewhere through said diversion line includes diverting the fluid elsewhere when the fluid pressure is determined to be higher than a predetermined high pressure threshold; and
   determining the fluid pressure in the line, and wherein directing said fluid elsewhere through said diversion line includes diverting said fluid elsewhere when said pressure is determined to be lower than a predetermined low pressure threshold.

19. The method of claim 17, further comprising:
   detecting contaminants in the fluid; and
   removing the contaminants from the fluid by filtering the fluid with a filter.

20. The method of claim 17, further comprising separating the fluid in gaseous form from fluid in liquid form.

21. The method of claim 17, wherein the predetermined condition correlates to keeping a pressure inside the vessel below a threshold safety pressure of the vessel.

22. The method of claim 17, wherein directing said fluid elsewhere through the diversion line includes diverting said fluid in gaseous form to one of a burner, a catalytic converter, another tank, a secondary user or a re-liquefication device.

* * * * *

UNITED STATES PATENT AND TRADEMARK OFFICE
CERTIFICATE OF CORRECTION

PATENT NO. : 11,149,693 B2
APPLICATION NO. : 16/437804
DATED : October 19, 2021
INVENTOR(S) : Kevin K. Oversby Page 1 of 1

It is certified that error appears in the above-identified patent and that said Letters Patent is hereby corrected as shown below:

On the Title Page

Item (71) Applicant:
"(71) Applicant: WESTPORT POWER INC., Vancouver (CA)"
Should read:
--(71) Applicant: WESTPORT FUEL SYSTEMS CANADA INC., Vancouver (CA)--.

Signed and Sealed this
Twenty-third Day of January, 2024

Katherine Kelly Vidal
*Director of the United States Patent and Trademark Office*